United States Patent
Allen et al.

(10) Patent No.: US 9,329,699 B2
(45) Date of Patent: May 3, 2016

(54) METHOD FOR SUBJECT CLASSIFICATION USING A PATTERN RECOGNITION INPUT DEVICE

(75) Inventors: Jeffrey David Allen, Richardson, TX (US); John Joseph Howard, Dallas, TX (US); Mitchell Aaron Thornton, Dallas, TX (US)

(73) Assignee: SOUTHERN METHODIST UNIVERSITY, Dallas, TX (US)

( * ) Notice: Subject to any disclaimer, the term of this patent is extended or adjusted under 35 U.S.C. 154(b) by 159 days.

(21) Appl. No.: 13/279,279

(22) Filed: Oct. 22, 2011

(65) Prior Publication Data

US 2012/0098750 A1 Apr. 26, 2012

Related U.S. Application Data

(60) Provisional application No. 61/405,988, filed on Oct. 22, 2010.

(51) Int. Cl.
*G06F 3/023* (2006.01)
*G06F 21/31* (2013.01)
*G06F 21/32* (2013.01)

(52) U.S. Cl.
CPC .............. *G06F 3/023* (2013.01); *G06F 21/316* (2013.01); *G06F 21/32* (2013.01)

(58) Field of Classification Search
CPC ....... G06F 3/023; G06F 21/316; G06F 21/32; G06F 21/31
USPC .............. 345/156–169; 726/19; 713/184, 185
See application file for complete search history.

(56) References Cited

U.S. PATENT DOCUMENTS

| 4,621,334 A | 11/1986 | Garcia |
| 4,805,222 A | 2/1989 | Young et al. |
| 6,035,398 A | 3/2000 | Bjorn |
| 6,442,692 B1 | 8/2002 | Zilberman |
| 7,802,103 B2 | 9/2010 | Bender et al. |
| 8,533,815 B1 * | 9/2013 | Upson et al. ..................... 726/19 |
| 2002/0153416 A1 * | 10/2002 | Kroll .............................. 235/380 |
| 2006/0271790 A1 * | 11/2006 | Chen ............................. 713/185 |
| 2009/0134972 A1 | 5/2009 | Wu, Jr. et al. |
| 2009/0278792 A1 * | 11/2009 | Toebes et al. ................. 345/156 |

OTHER PUBLICATIONS

Ahmed, A., et al., "Detecting Computer Intrusions Using Behavioral Biometrics," Citeseer, 8 pages.
Bergadano, Francesco, et al., "User Authentication through Keystroke Dynamics," ACM Transactions on Information and System Security (TISSEC), (2002), pp. 367-397.

(Continued)

*Primary Examiner* — Premal Patel
(74) *Attorney, Agent, or Firm* — Daniel J. Chalker; Chainey P. Singleton; Chalker Flores, LLP (57) ABSTRACT

The present invention provides a device and method for classifying a user using pattern recognition of an input device. A series of the keystroke objects are received via the user input interface. A typing signature is determined for the series of keystroke objects using the processor by analyzing the key attributes of the series of keystroke objects using a pattern recognition algorithm. The typing signature is compared to one or more user typing signatures stored in the memory using the processor. The user is classified based on whether or not the typing signature is statistically similar to one of the stored typing signatures.

32 Claims, 4 Drawing Sheets

(56) References Cited

OTHER PUBLICATIONS

Bleha, Saleh, et al., "Computer-Access Security Systems Using Keystroke Dynamics," IEEE Transactions on pattern Analysis and machine Intelligence, vol. 12, No. 12, Dec. 1990, 6 pages.
Brown, Marcus, et al., "User Identification Via Keystroke Characteristics of Typed Names Using Neural Networks," Int. J.Man—Machine Studies, (1993), 39:999-1014.
Cho, Sungzoon, et al., :"Artificial Rhythms and Cues for Keystroke Dynamics Based Authentication," IAPR International Conference on Biometrics, (2006), 7 pages.
Cho, Sungzoon, et al., Web Based Keystroke Dynamics Identity Verification Using Neural Network, Journal of Organizational Computing and Electronic Commerce, (2000), vol. 10, No. 4, pp. 295-307.
Clarke, N.L., et al., "Keystroke Dynamics on a Mobile Handset: A Feasibility Study," Information Management & Computer Security 11, 4, (2003), pp. 161-166.
Clarke, N.L., et al., "Authenticating Mobile Phone Users Using Keystroke Analysis," Int. J. Inf. Secur., (2007), 6:1-14.
Dietz, Paul H., et al., "A Practical Pressure Sensitive Computer Keyboard," ACM, (2009), pp. 55-58.
Douhou, Salima, et al., "The Reliability of User Authentication Through Keystroke Dynamics," Statistica Neerlandica, (2009), vol. 63, No. 4, pp. 432-449.
Feng, Hao, et al., "Private Key Generation From On-Line Handwritten Signatures," Information Management & Computer Security, (2002), 6 pages.
Gaines, R. Stockton, et al., "Authentication by Keystroke Timing: Some Preliminary Results," May 1980, 51 pages.
Goldberg, D., et al., "Genetic Algorithms and Machine Learning," Machine Learning 3, (1988), pp. 95-99.
Guven, Aykut, et al., "Understanding Users' Keystroke Patterns for Computer Access Security," Computers and Security 22, (2003), 8:695-706.
Jiang, Cheng-Huang, et al., "Keystroke Statistical Learning Model for Web Authentication," ACM, (2007), 3 pages.
Joyce, Rick, et al., "Identity Authentication Based on Keystroke Latencies," Communications of the ACM 33, Feb. 1990, vol. 33, No. 2, pp. 168-176.
Juels, Ari, et al., "A Fuzzy Commitment Scheme," Proceedings of the 6th ACM Conference on Computer and Communications Security, Kent Ridge Digital Labs, Singapore, (1999), pp. 28-36.
Leggett, John, et al., "Verifying Identity Via Keystroke Characteristics," Int. J. Man—machine Studies, (1988), 28:67-76.
Leggett, John, et al., "Dynamic Identity Verification Via Keystroke Characteristics," Int. J. Man—Machine Studies, (1991), 35:859-870.
Loy, Chen Change, et al., "The Development of a Pressure-Based Typing Biometrics User Authentication System," ASEAN Virtual Instrumentation Applications Contest Submission, National Instruments, (2005), 5 pages.
Mahalanobis, P.C., "On the Generalized Distance in Statistics," Journ. Asiat. Soc. Bengal, (1930), vol. II, No. 1, pp. 541-588.
Mahar, D., et al., "Optimizing Digraph-Latency Based Biometric Typist Verification Systems: Inter and Intra Typist Differences in Digraph latency Distributions," Int. J. Human—Computer Studies, (1995), 43:579-592.
Manber, Udi, "A Simple Scheme to Make Passwords Based on One-Way Functions Much Harder to Crack," Computers & Security (1996), vol. 15, No. 2, pp. 171-176.
Monrose, Fabian, et al., "Authentication Via Keystroke Dynamics," ACM New York, NY, USA, 11 pages.
Monrose, Fabian, et al., "Keystroke Dynamics as a Biometric for Authentication," Future Generation Computer Systems, (2000), pp. 351-359.
Monrose, Fabian, et al., "Cryptographic Key Generation from Voice," IEEE Symposium on Security and Privacy, May 2001, 12 pages.
Monrose, Fabian, et al., "Password Hardening Based on Keystroke Dynamics," International Journal of Information Security (2002), 2:69-83.
Nonaka, Hidetoshi, et al., "Sensing Pressure for Authentication System Using Keystroke Dynamics," Proceedings of the World Academy of Science, Engineering and Technology, vol. 1, Jan. 2005, pp. 19-22.
Obaidat, M.S., et al., "Verification of Computer Users Using Keystroke Dynamics," IEEE Transactions on Systems, Man and Cybernetics, Apr. 1997, vol. 27, No. 2, pp. 261-269.
Orceyre, M., et al., "Considerations in the Selection of Security Measures for Automatic Data Processing Systems," NBS Special Publication, (Jun. 1978), 40 pages.
Spillane, R.J., "Keyboard Apparatus for Personal Identification," Technical Report, IBM Technical Disclosure Bulletin, (1975), 2 pages.
Sternberg, Saul, et al., "The Latency and Duration of Rapid Movement Sequences: Comparisons of Speech and Typewriting," Information Processing in Motor Control and Learning, (1978), 117-152.
Umphress, David., et al., "Identity Verification Through Keyboard Characteristics," Int. J. Man-Machine Studies, (1985), 23:263-273.
Wobbrock, Jacob O., "Tapsongs: Tapping Rhythm-Based Passwords on a Single Binary Sensor," ACM, pp. 93-96.
Wood, Helen M., "The Use of Passwords for Controlled Access to Computer Resources," NBS Special Publication, (1977), 60 Pages.
Yu, Enzhe, et al., "Keystroke Dynamics Identity Verification—It's Problems and Practical Solutions," Computers & Security, (2004), 5:428-440.

* cited by examiner

METHOD FOR SUBJECT CLASSIFICATION USING A PATTERN RECOGNITION INPUT DEVICE

PRIORITY CLAIM AND CROSS-REFERENCE TO RELATED APPLICATIONS

This patent application is a non-provisional patent application of U.S. provisional patent application 61/405,988 filed on Oct. 22, 2010 and entitled "Method for Authentication Using a Pattern Recognition Keyboard", which is hereby incorporated by reference in its entirety.

TECHNICAL FIELD OF THE INVENTION

The present invention relates in general to the field of subject classification, and more specifically to a system and method for subject classification using a pattern recognition input device.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

The management of passwords has become problematic for both users and system administrators in nearly all industries due to the fact that users are typically encouraged to create hard-to-guess passwords that are often also hard to remember.

Initial efforts in Keystroke Dynamics (KD) were largely focused on dynamic or continuous authentication that is, users were being continually verified throughout the duration of their session. This process typically involves creating a global representation of how the user types and then being able to predict their typing patterns a priori for any input which requires a lengthy training set (e.g., typically hundreds or thousands of characters). In this way, the user is continually authenticated throughout the duration of his or her session. The other approach has used static authentication, or 'simple discrimination' which is reminiscent of more traditional login methods.

For example, U.S. Pat. No. 4,621,334, entitled Personal Identification Apparatus describes a method and apparatus is disclosed for verifying whether a particular individual is a member of a predetermined group of authorized individuals. The subject apparatus is particularly suited for controlling access to a secure resource such as a computer network or database and time delays are measured between successive strokes of a keyboard as the individual enters his name. A timing vector, which is constructed from the time delays, is statistically compared with a stored timing vector derived from the authorized individual. If the timing vectors are statistically similar, the individual will be permitted access to the resource.

As a result, there is a need for an apparatus and method for the classification of subjects based on keyboard input characteristics for the purposes of identification to enable a variety of resulting processing applications including that of user authentication.

BRIEF SUMMARY OF THE INVENTION

The present invention provides a keyboard interface routine to interpret signals from the keyboard, a keystroke analysis algorithm to generate unique typing signatures, and a signature comparison function to compare current typing habits to established signatures for the purpose of identification.

The present invention provides an input device that includes a user input interface coupled to one or more sensors. The input device is communicably coupled to a processor. A memory is communicably coupled to the processor. The one or more sensors coupled to the user input interface create a keystroke object whenever a single user input is received by the user input interface. The keystroke object includes three or more key attributes comprising pressure data and timing data measured during entry of the single user input, and a unique symbol, function or command associated with the single user input. The processor (a) receives a series of the keystroke objects, (b) determines a typing signature for the series of keystroke objects by analyzing the key attributes of the series of keystroke objects using a pattern recognition algorithm, (c) compares the typing signature to one or more user typing signatures stored in the memory, and (d) classifies the user based on whether or not the typing signature is statistically similar to one of the stored typing signatures.

In addition, the present invention provides a method for classifying a user using pattern recognition of an input device. An input device is provided that has a user input interface, one or more sensors, a processor and a memory, wherein (a) a keystroke object is created whenever a single user input is received by the user input interface, and (b) the keystroke object includes three or more key attributes comprising pressure data and timing data measured by the one or more sensors during entry of the single user input, and a unique symbol, function or command associated with the single user input. A series of the keystroke objects are received via the user input interface. A typing signature is determined for the series of keystroke objects using the processor by analyzing the key attributes of the series of keystroke objects using a pattern recognition algorithm. The typing signature is compared to one or more user typing signatures stored in the memory using the processor. The user is classified based on whether or not the typing signature is statistically similar to one of the stored typing signatures. Moreover, the method can be implemented as a non-transitory computer readable medium having one or more code segments that perform the steps when executed by one or more processors.

BRIEF DESCRIPTION OF THE SEVERAL VIEWS OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein, the term keyboard or keypad may be used to denote any input device that uses a touch based input device. One embodiment of the instant invention includes a limited number of keys that may be pressed, e.g., a keypad or simple buttons. In some embodiments, the device may be keyboard with one or more sensors located at one location or multiple locations on either the key or the board or a sensor under the device. In other embodiments, the device may be a touch screen or a touch pad that includes an internal sensor (e.g., location, pressure, force, visual, time, etc.) and the touching of the surface records one or more parameters of the contact. The present invention can be used in any application that at least one parameter may be recorded from a key stroke. This can be a touch screen phone or computer to the inputting of data into a text box that measures the time intervals for key strokes.

The ability to examine signals coming from the keyboard hardware is the first crucial aspect of the typing pattern recognition system. These signals are actually an uninterrupted steam of packets from the keyboard that indicate which keys are pushed down and the pressure or other characteristic data with which they are being depressed for a given time instance. By perpetually examining these communications, the Keyboard Interface Routine can monitor when a key's up or down state changes. When these events occur the function takes the appropriate steps to either instantiate a new keystroke object (for the case where a state has change from up to down) or to finished packaging an already created keystroke object (for the case when a state has changed from down to up).

The characters entered by a user are only one attribute of the way they are interacting with the keyboard. They press down on keys with various intensities (though this typically can't be measured by the keyboard) and have various timing attributes associated with different combinations of keys. The present invention provides a system which adds additional components on top of the mere character string which makes up the password. In this way, an intruder could know the character string which makes up your password, but still not be able to replicate the physical movements required to authenticate.

The keystroke object is a neatly packaged container of all the relevant information associated with a single depression and release of a key. This information may include time (in nanoseconds) that the keyboard first recognized a particular key as depressed, the unique letter or symbol associated with the key, the last time that the keyboard registered the key as depressed, and a vector of variable length that represents the pressure or other characteristic data associated with each signal that was observed by the interface. The length of this pressure or other characteristic data varies depending on the overall depression time of the particular key. Once this information has been organized and collected into a unique object the structure is then passed to the keystroke analysis algorithm for interpretation.

The next part analyzes the keystroke objects that are passed to it by the interface for the purpose of establishing a standard typing signature for a particular user or group of users. The essential component here is to be able to create the "signature" of a user, based on one or more entries. Based on this signature, later entries can be compared in order to evaluate the likelihood that the user entering the password is the same user as the one who generated the signature earlier.

One embodiment is to use the means and standard deviations of each key attribute and measure on that basis. For instance, a system was built which penalized users for each standard deviation away from the mean they were for each attribute. Other embodiments include a variety of other machine learning techniques.

One key consideration of the integration of a pressure-sensitive or other characteristic-sensitive device in performing identity verification. These sensor-based attributes come in a variety of forms. To give two examples: the average pressure over the duration of a keystroke and compute the similarity to previously entered averages of that user. Also, a curve can be fit to the points representing the pressure of a keystroke. In this way, the similarity of two key-presses can be compared mathematically in terms of their underlying form or structure (statistical similarity).

Various other components have also been integrated: for instance, an algorithm which tracks the past false entries and will penalize similarity to those entries. In this way, a false user would continually be penalized for a similarity to their previously rejected typing pattern. In this way, users who continue to guess at another user's password will get progressively worse scores.

Figure 1:
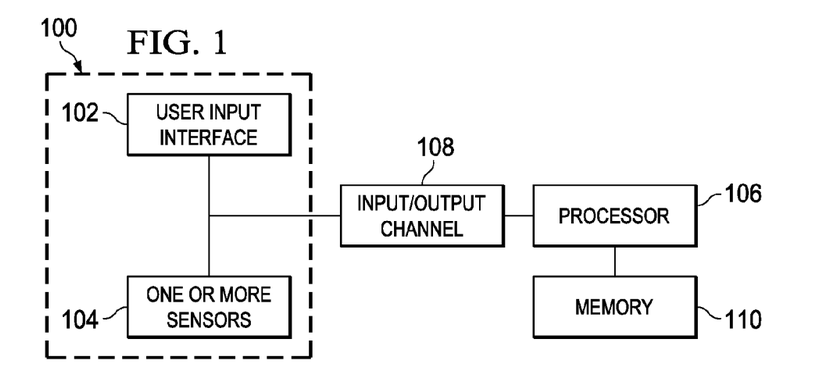
FIG. 1 is a block diagram of an input device in accordance with one embodiment of the present invention.

Now referring to FIG. 1, a block diagram of an input device 100 in accordance with one embodiment of the present invention is shown. The input device 100 includes a user input interface 102 coupled to one or more sensors 104. The user input interface 100 can be a keyboard, a keypad, one or more keys, one or more buttons, a touch screen or a touch pad. The input device 100 is communicably coupled to a processor 106 via an input/output (I/O) channel 108. A memory 110 is communicably coupled to the processor 106. The one or more sensors 104 coupled to the user input interface 102 create a keystroke object whenever a single user input is received by the user input interface 102. The single user input can be a user touching a screen in a specific location, pressing down a specific key, making a specific motion on a touch screen or other process for inputting data into the device. The keystroke object includes three or more key attributes comprising pressure data and timing data measured during entry of the single user input, and a unique symbol, function or command associated with the single user input. The processor 106 (a) receives a series of the keystroke objects, (b) determines a typing signature for the series of keystroke objects by analyzing the key attributes of the series of keystroke objects using a pattern recognition algorithm, (c) compares the typing signature to one or more user typing signatures stored in the memory, and (d) classifies the user based on whether or not the typing signature is statistically similar to one of the stored typing signatures.

The series of keystroke objects can be a user name, a user identifier, a password, a passcode, a passphrase, a response to a security question or a combination thereof. The receiving, determining and comparing steps performed by the processor 106 can be repeated for two or more series of keystroke objects before performing the classifying step. Moreover, the series of keystroke objects can be preset, continuous, periodic or random. Note that each successive piece of information input into the system must be distinct and measurable. The input device 100 can be communicably coupled or integrated into a computer, a laptop, a workstation, a phone, a user device, an electronic tablet, an entertainment device (e.g., game controller, game console, gaming device, electric piano, electric organ, etc.), a security device, a machine, a vehicle or a combination thereof. The classification comprises an authentication or verification of the user, a classification of the user as a member of a group or a combination thereof. The processor 106 can provide the classification to the user.

In addition, the processor 106 can stores the user typing signature for a particular user and a particular series of keystroke objects. The processor 106 can receive the particular series of keystroke objects, and determine the user typing signature for the particular series of keystroke objects by analyzing the key attributes of the particular series of keystroke objects using the pattern recognition algorithm.

The timing data may include a hold time for the single user input and a flight time between the single user input and a previous single user input, if any. The pressure data may include a maximum pressure and one or more other pressures measured during the hold time for the single user input. Alternatively, the pressure data may include a maximum pressure, two or more other pressures measured during a hold time for the single user input, an average pressure measured during the hold time for the single user input, a vector of variable length that represents pressure measured during the hold time for the single user input, a continuous stream or function describing pressure measured during the hold time for the single user input or a combination thereof.

The processor 106 can also fit a polynomial curve to the keystroke object for use by the pattern recognition algorithm, calculate a mean and a standard deviation of each keystroke object for use by the pattern recognition algorithm, or provide any other desirable analysis or comparison. For example, the user typing signature can be an adaptive signature that encompasses a mood and a posture of the user and the input device 100 to gradually become more specific over time. A variable threshold value can be adjusted to change a true positive rate and/or a true negative rate of the classification. Moreover, the threshold for the statistical similarity determination changes over time, changes based on a location of the input device, changes based on one or more security parameters or a combination thereof.

Note that the input device 100, which is the combination of the user input interface 100 and the one or more sensors 104, can be packaged or integrated together into a keyboard, a keypad, one or more keys, one or more buttons, a touch screen or a touch pad. The input device 100 can also include other components, elements and functionality.

Figure 2:
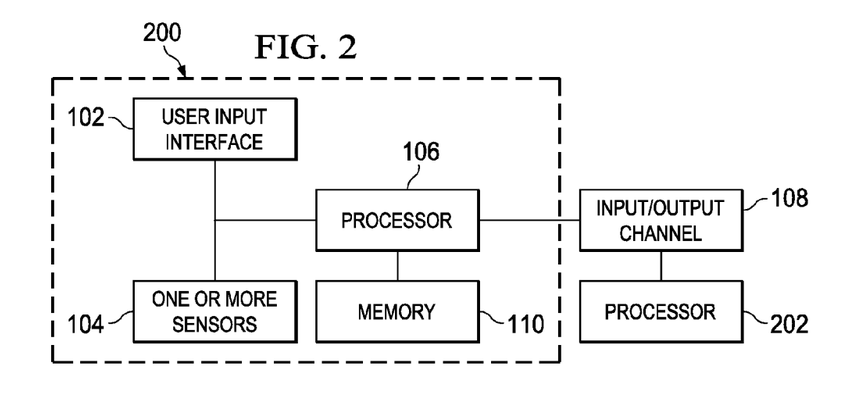
FIG. 2 is block diagram of an input device in accordance with another embodiment of the present invention.

Referring now to FIG. 2, a block diagram of an input device 200 in accordance with another embodiment of the present invention is shown. Input device 200 is similar to input device 100, except the processor 106 and memory 110 are integrated into the input device 200. The input device 200 includes a user input interface 102 coupled to one or more sensors 104. The user input interface 100 can be a keyboard, a keypad, one or more keys, one or more buttons, a touch screen or a touch pad. The processor 106 is communicably coupled to the user input device 102, the one or more sensors 104 and the memory 110. The processor 106 is communicably coupled to a second processor 202 (e.g., a system or main device processor) and via an input/output (I/O) channel 108. The one or more sensors 104 coupled to the user input interface 102 create a keystroke object whenever a single user input is received by the user input interface 102. The single user input can be a user touching a screen in a specific location, pressing down a specific key, making a specific motion on a touch screen or other process for inputting data into the device. The keystroke object includes three or more key attributes comprising pressure data and timing data measured during entry of the single user input, and a unique symbol, function or command associated with the single user input. The processor 106 (a) receives a series of the keystroke objects, (b) determines a typing signature for the series of keystroke objects by analyzing the key attributes of the series of keystroke objects using a pattern recognition algorithm, (c) compares the typing signature to one or more user typing signatures stored in the memory, and (d) classifies the user based on whether or not the typing signature is statistically similar to one of the stored typing signatures.

Figure 3:
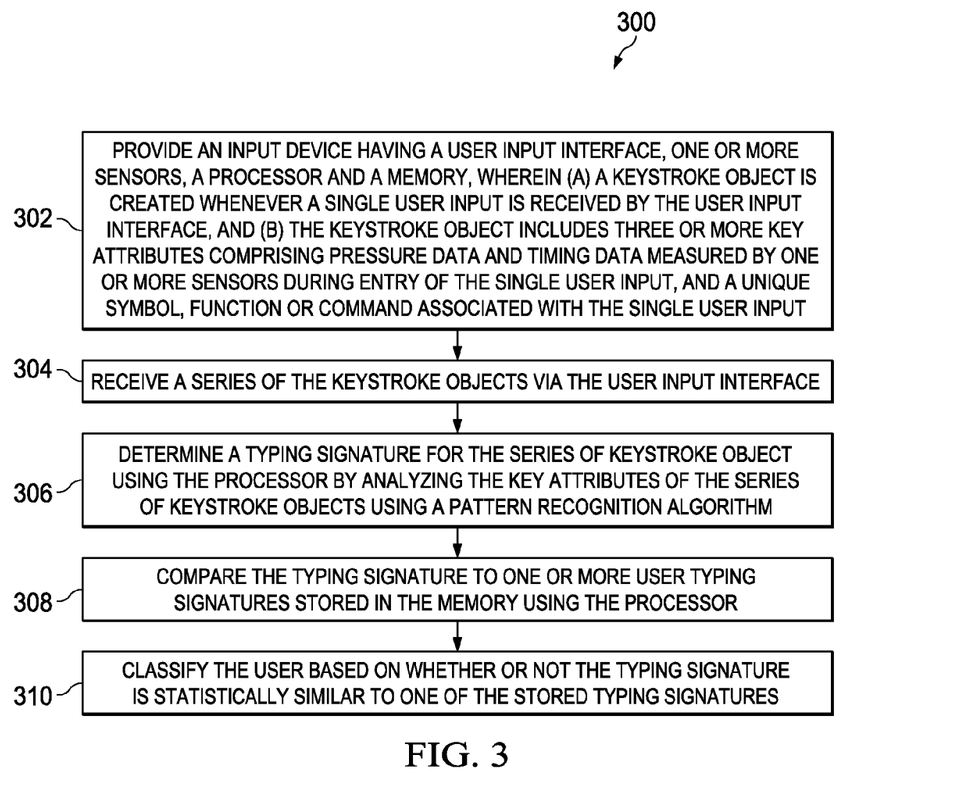
FIG. 3 is flow chart of a method in accordance with another embodiment of the present invention.

Now referring to FIG. 3, a flow chart of a method 300 for classifying a user using pattern recognition of an input device in accordance with another embodiment of the present invention is shown. An input device is provided in block 302. The input device has a user input interface, one or more sensors, a processor and a memory, wherein (a) a keystroke object is created whenever a single user input is received by the user input interface, and (b) the keystroke object includes three or more key attributes comprising pressure data and timing data measured by the one or more sensors during entry of the single user input, and a unique symbol, function or command associated with the single user input. A series of the keystroke objects are received via the user input interface in block 304. A typing signature is determined for the series of keystroke objects using the processor by analyzing the key attributes of the series of keystroke objects using a pattern recognition algorithm in block 306. The typing signature is compared to one or more user typing signatures stored in the memory using the processor in block 308. The user is classified based on whether or not the typing signature is statistically similar to one of the stored typing signatures in block 310. The method 300 may include other steps or processes described herein. Moreover, the method 300 can be implemented as a non-transitory computer readable medium having one or more code segments that perform the steps when executed by one or more processors.

Figure 4:
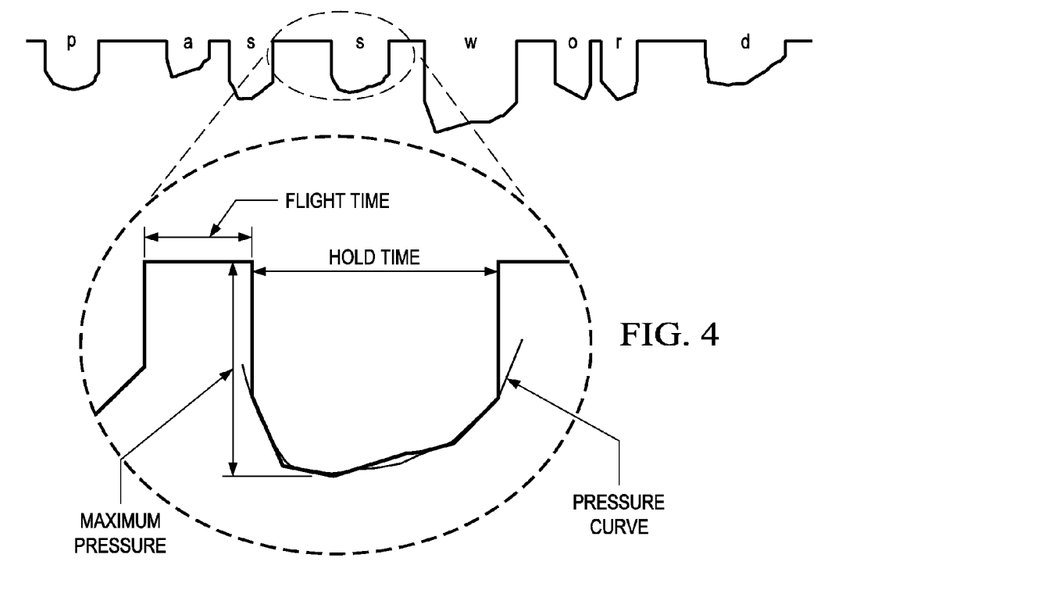
FIG. 4 is an illustration of various parameters that can be evaluated in order to determine a typing signature in accordance with another embodiment of the present invention.

Referring now to FIG. 4, an illustration of various parameters that can be evaluated in order to determine a typing signature in accordance with another embodiment of the present invention. For example, the Flight Time can be defined as the elapsed time between the release of $key_i$ to the depression of $key_{i+1}$. Hold Time can be defined as the amount of time between the depression of $key_i$ to the release of $key_i$. The Pressure of depressed keys is read as an 8-bit value at a pulse of ~10 ms. Each keypress, then, will generally have multiple pressures associated with it (one for each 10 ms the key was pressed). The average of these values is normalized. Pressure Curve. As described above, the keyboard produces a series of points representing the pressure of the keystroke over time. A polynomial curve can be fit to these points in order to examine how the key was pressed.

These four attributes are recorded about each keystroke and are used to evaluate the likelihood that the user entering the password is the person they are claiming to be or, or their membership into a previously established group. This calculation considers the in/consistency of each attribute. For instance, if a user often forgets where the "w" key is (thus, the flight time before the "w" key is quite variable), he or she will not be penalized for a variability (in either direction of the average) on this attribute. However, if a particular user holds down a key for the same amount of time (+/−a few ms) every time they have entered the password, then a deviation from this average would be heavily penalized.

One critical concern when implementing such a system is the variability of a typing "signature." Surely, typing patterns can be affected by mood, energy level, etc. All of these things must be considered when designing and testing such a system. The approach taken to handle this concern is to create an adaptive signature. Each time the user successfully logs in to the system, his or her signature updates just slightly. In this way, the signature will grow to encompass all of a user's moods, postures, and keyboards, and can gradually get more specific over time. This also addresses the issue of a user becoming more competent at typing a particular password.

Figure 5:
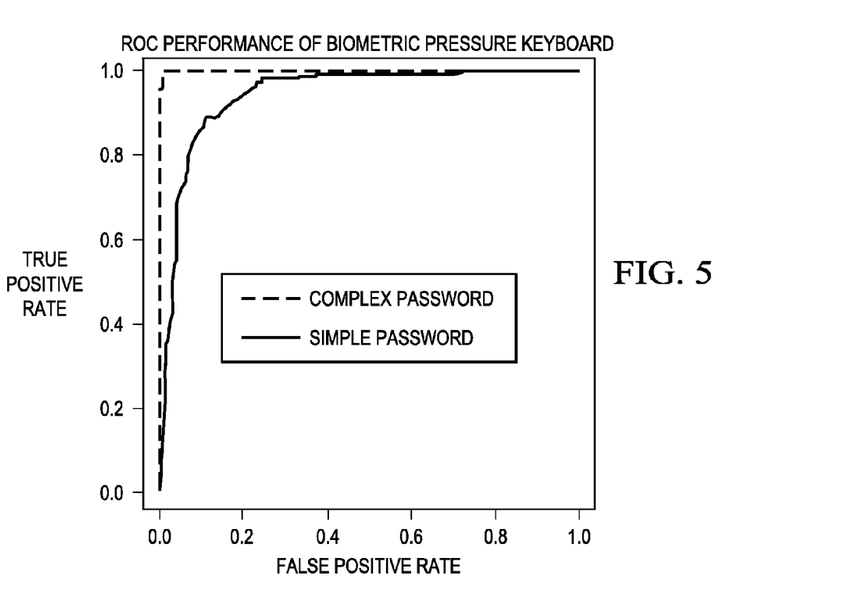
FIG. 5 is a plot of the performance of a biometric pressure keyboard in accordance with one embodiment of the present invention.

Now referring to FIG. 5, a plot of the performance of a biometric pressure keyboard in accordance with one embodiment of the present invention is shown. The accuracy of the algorithm depends largely on how the user types. Users who use similar finger arrangements on the keyboard tended to have more similar typing patterns than those who did not. For example, two users who use separate fingers to type "a" and "s" have more similar signatures among themselves than they do with a user who uses the same finger for both. For example, a strong password in the system of the present invention is one in which the user demonstrates a variety of uncommon typing patterns. We differentiate between "complex" or "strong" passwords and "simple" or "weak" passwords on this basis. The areas under the curve (AUCs) for the above ROC curve are 0.997 and 0.952 for the complex and simple passwords, respectively. The threshold could obviously be set very strictly or liberally, depending on the application. For the complex password, for example, we chose to set the password such that we had a 96.1% true positive rate (i.e. the true user will be granted access 19 out of 20 attempts) and a 99.4% true negative rate (meaning that false users are rejected from the system 199 out of 200 attempts).

Another embodiment of the present invention provides a modified algorithm such that the correctness of the characters entered is no longer a Boolean value, but is another continuous variable which gets assigned a percentage based on the closeness of the entered text to the actual password. In this way, a typo might not be detrimental to password entry. Note that this implementation might address the issue of a sub-100% true-positive rate by bolstering the standard password entry's true-positive rate.

We define user identification, within the context of computer security, as an attempt to recognize, out of some set of users U, the current user, $X \subseteq U$. Note that the performance of this process is typically dependent on /U/. We define user authentication as the process of verifying that the user currently using the computer truly is the user they are claiming to be, or is a member of a set of previously computed groups. This process typically involves the user specifying some unique user identifier before logging in. Because the identification process is completed upon entering the unique identifier, the performance of authentication typically does not depend on the number of users in the system. The terms "authentication," "classification," and "verification" are used herein interchangeably. Alternatively, this classification could be used continuously throughout the duration of a user's session and could be used to estimate a user's gender or association with some group of individuals with a common set of social characteristics.

This process is typically trained on a short keyword or set of keywords (potentially a secret) without concern for the user's global typing habits; some studies have used secret passwords, the user's own name, or some additional constant keyword. Such training can occur in either an overt or covert manner. Note that there can be some overlap between these two classifications. For instance, static keywords could be predefined and continually used to validate a user throughout the session which would allow for continuous authentication while only analyzing the user's typing patterns over a small set of words. On a traditional keyboard, two types of information are transmitted to the computer at each keypress: the address or character representation of the key pressed and the timing data (typically key down and key up events). Typically, implementations compare the stored password and the entered password discretely and produce a binary output.

The remaining variables deal with the timing data associated with key presses. There is a plethora of different ways to process the timing data, some of which will be elaborated upon in the literature review. Fundamentally, however, there are two differing views associated with the human-keyboard interaction. Some studies only consider the time interval from key down to the next key down. This produces one timing value for each keystroke. Others have considered two discrete values for each keystroke: the key press duration (key down to key up) and the key flight time (the interval from key up to the next key's key down).

The one additional variable to be considered in one embodiment of the present invention is the 'force' or 'pressure' associated with each keystroke. We will derive our pressure readings from a pressure-sensitive keyboard developed by Dietz in 2009. This keyboard is distinct from previous pressure-sensitive keyboards in that it modifies very little about the structure of the keyboard and could be "inexpensively mass-produced". The pressure-sensitivity involves only a subtle change to the keyboard's mechanics. Rather than using a highly-conductive sensor underneath each key to detect when that key has been pressed, Dietz uses a Carbon pad which produces a variable amount of current based on the pressure exerted on the two contacts. This subtle change, when analyzed later in embedded logic, can produce a reading of the pressure currently exerted on any depressed key.

The present invention provides pressure variables on each keystroke and will consider how best to process the data. Various options present themselves: raw maximum pressure, maximum pressure normalized over some value, average pressure throughout the keystroke, some analysis of the shape of the curve, etc. Regardless of the number of features an algorithm extracts per keystroke, there will be additional information delivered with each keystroke. Thus, there is typically more information contained in a long passage of entered text than there would be in a short password. This information can be used to differentiate one user from another more precisely.

One primary interest in the field of keystroke dynamics is the comparison of various implementations. The most basic score of a user authentication algorithm is based on how often it correctly classifies users. This classification can be visualized in the Table below:

|  |  | Actual User | |
| --- | --- | --- | --- |
|  |  | True User | Imposter |
| Algorithm's Action | Accept | True Positive | False Positive |
|  | Reject | False Negative | True Negative |

It is trivial to normalize each of these to get a rate of occurrence of each classification. The goal of any user authentication algorithm is to maximize the True Positive Rate (admitting the true user into the system) and True Negative Rate (rejecting impostors). This minimizes the False Positives (rejecting the true user) and False Negatives (admitting an impostor). In a perfect system, the False Positive Rate and False Negative Rate would both be 0%.

In most non-binary systems (such as keystroke dynamics), there is some value which represents the system's confidence that the current user truly is the user he or she is claiming to be. Thus, some threshold (could be globally defined or defined for individual users) will be imposed to determine what score is required to be granted access. Obviously, varying this threshold either makes the system more strict or more liberal in whom it admits.

False Negatives (also called False Alarm Rate (FAR) or Type II errors) are typically viewed as an inconvenience, the user will just have to attempt to login again. False Positives (also called Impostor Pass Rate (IPR) or Type I errors) are generally the more grave concern of security engineers. These indicate that the incorrect user was granted access to the system. In most applications, False Positives are minimized as much as is reasonably possible while maintaining system usability.

One of the largest hurdles in comparing competing KD (or any biometric) algorithms is the reliance on these two inversely-related variables. For instance, it is difficult to say whether an algorithm with a 10% False Positive Rate (FPR) and a 0% False Negative Rate (FNR) is better than an algorithm with a 3% FPR and a 7% FNR. Both of these scores were determined by some arbitrarily set threshold and cannot be fairly compared without some additional information.

One score which attempts to provide more accurate comparisons is the Equal Error Rate (or Crossover Rate). This score is the result of setting the threshold such that the FNR=FPR. This reduces the score down to one number which simultaneously represents both of the False scores in a system.

An alternative method to analyze the algorithm is based on the analysis of a Receiver Operating Characteristic (ROC) curve. By plotting the True Positive Rate against the False Positive Rate, one can reduce the performance at a certain threshold to a single point. By plotting out the performance across all thresholds ranging from the lowest True score (inclusive) to the highest False score (inclusive), a two-dimensional graph can visually display the performance of a system at all thresholds. There are two reasonable ways to process the ROC in this context.

First, the entire area under the ROC curve can be calculated; this is also called the Area Under the Curve or just 'AUC.' A perfect system would have an AUC of 1, in that there is some interval of thresholds for which all true entries are admitted and all impostor entries are rejected. A random guess would produce an AUC of 0.5, as it would still get 50% of the classifications correct.

Figure 6A:
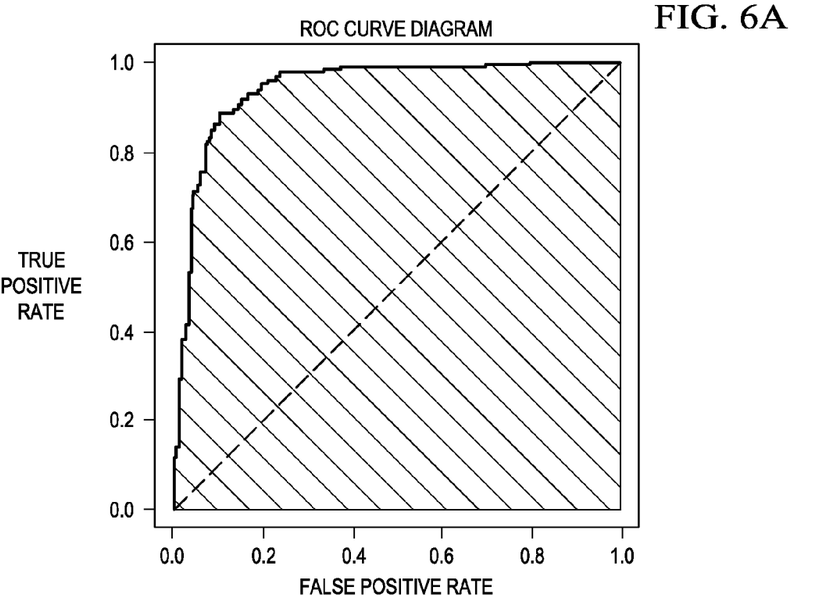
FIGS. 6A and 6B are graphs of a Receiver Operating Characteristic (ROC) curve and the partial area under the curve (pAUC) for FPR≤0.05.
Figure 6B:
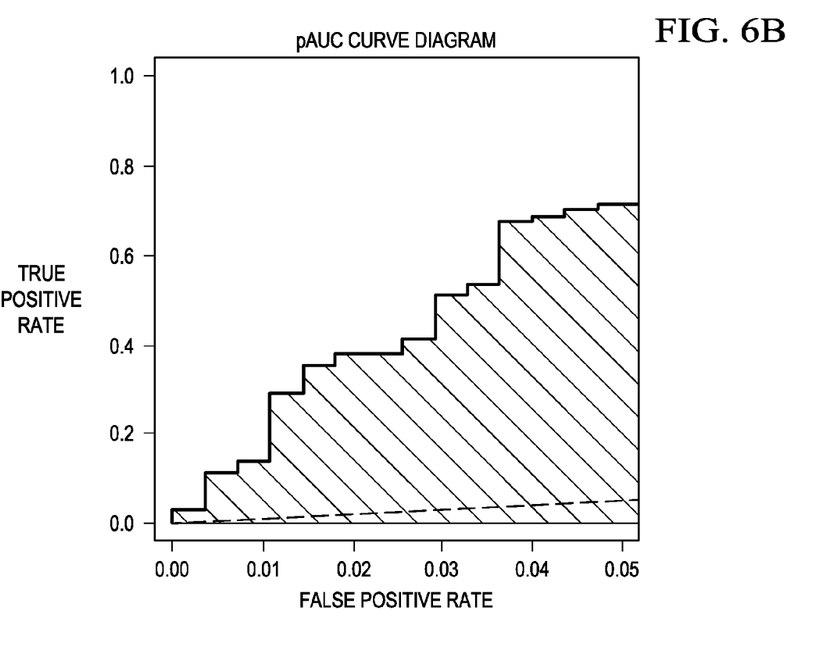

FIGS. 6A and 6B are graphs of a Receiver Operating Characteristic (ROC) curve and the partial area under the curve (pAUC) for FPR≤0.05. The red curve in FIG. 6A is the threshold-independent performance of this example and the black line is the performance of a random guess.

More specifically, one can analyze the Partial AUC (pAUC) for a more specific portrayal of performance under certain conditions. The partial AUC calculates the AUC under some narrower range of TPRs or FPRs. For instance, if some system required a FPR of ≤0.05, then the performance of the algorithm for all thresholds which produce a FPR of >0.05 are meaningless and should be thrown out. By calculating the pAUC on only the relevant range of entries, one can obtain more specific information about the performance of an algorithm under certain constraints.

Using the results of the algorithm, we are able to observe certain trends in the data. However, if a formal method is needed, we can compute the Hamming distance from one sequence to the next and examine only those sequences with very small Hamming distances. This provides a controlled environment in which we can study the performance of varying only one or two bits in order to see how the performance is changed. It is also possible to manually force runs on sequences with certain deviations from a given sequence. This allows us to explain some observations about some of the more noticeable factors in the performance of the various algorithms. Another approach, depending on the number of different sequences is to compare the p/AUC for both values of each bit, i.e. compute the average p/AUC for all tests in which the first bit was set to 0, and compare that to all tests in which the first bit was 1.

The present invention also provides a method for providing encryption for different scenarios. For example a home use may require the parameters of or tolerance of the similarities between the input and the stored profile be more tolerant to allow more convenience. In contrast, many applications may trade convenience for security and have less tolerance for discrepancies. The present invention allows the customization of the settings to allow variations of these extremes. In some instances, this tolerance may be adjusted on sight, off sight or in response to a specific event or program to allow a continuously adjusting password verification. These parameters may be stored in a profile that allows data to be compiled, classified and sorted. For example, a web site may record the parameters of the keystrokes or a keyboard may record the time pressure and location of the keystrokes and store them in a profile. That profile can then be analyzed and classified (e.g., age, sex, race, dominate typing hand, etc) to use in marketing, studies and so forth.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method for classifying a user using pattern recognition of an input device comprising the steps of:
providing an input device having a user input interface, one or more sensors, a processor and a memory, wherein (a) a keystroke object is created whenever a single user input is received by the user input interface, and (b) the keystroke object includes three or more key attributes comprising (1) a vector of variable length representing pressure data measured by the one or more sensors during entry of the single user input, (2) timing data measured by the one or more sensors during entry of the single user input, and (3) a unique symbol, function or command associated with the single user input;
receiving a series of the keystroke objects via the user input interface;
determining a typing signature for the series of keystroke objects using the processor by analyzing the three or more key attributes for each keystroke object within the series of keystroke objects using a pattern recognition algorithm;
comparing the typing signature to one or more user typing signatures stored in the memory using the processor, wherein each stored user typing signature includes a user specific inconsistency/consistency factor for each of the key attributes of the series of keystroke objects that either permits or penalizes a variability in the each of the key attributes of the stored typing signature; and
classifying the user based on whether or not the typing signature is statistically similar to one of the stored user typing signature, and updating the stored user typing signature for the user whenever the typing signature is statistically similar to the stored user typing signature of the user.

2. The method of claim 1, further comprising the step of storing the user typing signature for a particular user and a particular series of keystroke objects via the input device.

3. The method of claim 2, further comprising the steps of:
receiving the particular series of keystroke objects via the user input interface; and
determining the user typing signature for the particular series of keystroke objects using the processor by analyzing the key attributes of the particular series of keystroke objects using the pattern recognition algorithm.

4. The method of claim 1, further comprising the step of providing the classification of the user to the user.

5. The method of claim 1, wherein:
the user input interface comprises a keyboard, a keypad, one or more keys, one or more buttons, a touch screen or a touch pad;
the series of keystroke objects comprise a user name, a user identifier, a password, a passcode, a passphrase, a response to a security question or a combination thereof;
the input device is communicably coupled or integrated into a computer, a laptop, a workstation, a phone, a user device, an electronic tablet, an entertainment device, a security device, a machine, a vehicle or a combination thereof; and
the classification comprises an authentication or verification of the user, a classification of the user as a member of a group or a combination thereof.

6. The method as recited in claim 1, wherein the receiving, determining and comparing steps are repeated for two or more series of keystroke objects before performing the classifying step.

7. The method of claim 1, wherein:
the timing data comprises a hold time for the single user input and a flight time between the single user input and a previous single user input, if any; and
the pressure data comprises a maximum pressure and one or more other pressures measured during the hold time for the single user input.

8. The method of claim 1, wherein the pressure data comprises a maximum pressure, two or more other pressures measured during a hold time for the single user input, an average pressure measured during the hold time for the single user input, a continuous stream or function describing pressure measured during the hold time for the single user input or a combination thereof.

9. The method of claim 1, wherein the series of keystroke objects is preset, continuous, periodic or random.

10. The method of claim 1, further comprising the step of fitting a polynomial curve to the keystroke object for use by the pattern recognition algorithm.

11. The method of claim 1, further comprising the step of calculating a mean and a standard deviation of each keystroke object for use by the pattern recognition algorithm.

12. The method of claim 1, wherein the stored user typing signature comprises an adaptive signature that encompasses a mood and a posture of the user and the input device to gradually become more specific over time.

13. The method of claim 1, wherein a variable threshold value can be adjusted to change a true positive rate and/or a true negative rate of the classification.

14. The method of claim 1, wherein a threshold for the statistical similarity determination changes over time, changes based on a location of the input device, changes based on one or more security parameters or a combination thereof.

15. The method as recited in claim 1, wherein the one or more stored user typing signatures further comprise one or more stored past false entries, and the comparison step further comprises penalizing the typing signature that is statistically similar to one of the stored past false entries.

16. The method as recited in claim 1, wherein the comparison and classification steps allows a deviation in the unique symbol, function or command of the keystroke objects in the typing signature as compared to the unique symbol, function or command of the keystroke objects in the stored user typing signature.

17. The method as recited in claim 1, further comprising the step of, after the user has been authenticated or validated, continuously validating the user throughout a user session when one or more sets of keystroke objects corresponding to one or more predefined keywords are entered by the user.

18. A pattern recognition input device comprising
a user input interface;
one or more sensors coupled to the user input interface that create a keystroke object whenever a single user input is received by the user input interface, wherein the keystroke object includes three or more key attributes comprising (1) a vector of variable length representing pressure data measured by the one or more sensors during entry of the single user input, (2) timing data measured by the one or more sensors during entry of the single user input, and (3) a unique symbol, function or command associated with the single user input;
a processor communicably coupled to the one or more sensors;
a memory communicably coupled to the processor; and
wherein the processor (a) receives a series of the keystroke objects, (b) determines a typing signature for the series of keystroke objects by analyzing the three or more key attributes for each keystroke object within [[of]] the series of keystroke objects using a pattern recognition algorithm, (c) compares the typing signature to one or more user typing signatures stored in the memory, wherein each stored user typing signature includes a user specific inconsistency/consistency factor for each of the key attributes of the series of keystroke objects that either permits or penalizes a variability in each one of the key attributes of the stored typing signature and (d) classifies the user based on whether or not the typing signature is statistically similar to one of the stored user typing signatures, and updates the stored user typing signature for the user whenever the typing signature is statistically similar to the stored user typing signature of the user.

19. The input device of claim 18, wherein the processor further stores the user typing signature for a particular user and a particular series of keystroke objects.

20. The input device of claim 19, wherein the processor further receives the particular series of keystroke objects, and determines the user typing signature for the particular series of keystroke objects by analyzing the key attributes of the particular series of keystroke objects using the pattern recognition algorithm.

21. The input device of claim 18, wherein the processor further provides the classification of the user to the user.

22. The input device of claim 18, wherein:
the user input interface comprises a keyboard, a keypad, one or more keys, one or more buttons, a touch screen or a touch pad;
the series of keystroke objects comprise a user name, a user identifier, a password, a passcode, a passphrase, a response to a security question or a combination thereof;
the input device is communicably coupled or integrated into a computer, a laptop, a workstation, a phone, a user device, an electronic tablet, an entertainment device, a security device, a machine, a vehicle or a combination thereof; and
the classification comprises an authentication or verification of the user, a classification of the user as a member of a group or a combination thereof.

23. The input device of claim 18, wherein the receiving, determining and comparing steps performed by the processor are repeated for two or more series of keystroke objects before performing the classifying step.

24. The input device of claim 18, wherein:
the timing data comprises a hold time for the single user input and a flight time between the single user input and a previous single user input, if any; and
the pressure data comprises a maximum pressure and one or more other pressures measured during the hold time for the single user input.

25. The input device of claim 18, wherein the pressure data comprises a maximum pressure, two or more other pressures measured during a hold time for the single user input, an average pressure measured during the hold time for the single user input, a continuous stream or function describing pressure measured during the hold time for the single user input or a combination thereof.

26. The input device of claim 18, wherein the series of keystroke objects is preset, continuous, periodic or random.

27. The input device of claim 18, wherein the processor further fits a polynomial curve to the keystroke object for use by the pattern recognition algorithm.

28. The input device of claim 18, wherein the processor further calculates a mean and a standard deviation of each keystroke object for use by the pattern recognition algorithm.

29. The input device of claim 18, wherein the stored user typing signature comprises an adaptive signature that encompasses a mood and a posture of the user and the input device to gradually become more specific over time.

30. The input device of claim 18, wherein a variable threshold value can be adjusted to change a true positive rate and/or a true negative rate of the classification.

31. The input device of claim 18, wherein a threshold for the statistical similarity determination changes over time, changes based on a location of the input device, changes based on one or more security parameters or a combination thereof.

32. A non-transitory computer readable medium for classifying a user using pattern recognition of an input device having a user input interface, one or more sensors, a processor and a memory, wherein (a) a keystroke object is created whenever a single user input is received by the user input interface, and (b) the keystroke object includes three or more key attributes comprising (1) a vector of variable length representing pressure data measured by the one or more sensors during entry of the single user input, (2) timing data measured by the one or more sensors during entry of the single user input, and (3) a unique symbol, function or command associated with the single user input, the non-transitory computer readable medium comprising:

a code segment for receiving a series of the keystroke objects via the user input interface;

a code segment for determining a typing signature for the series of keystroke objects using the processor by analyzing the three or more key attributes for each keystroke object within the series of keystroke objects using a pattern recognition algorithm;

a code segment for comparing the typing signature to one or more user typing signatures stored in the memory using the processor, wherein each stored user typing signature includes a user specific inconsistency/consistency factor for each of the key attributes of the series of keystroke objects that either permits or penalizes a variability in each of the key attributes of the stored typing signature; and a code segment for classifying the user based on whether or not the typing signature is statistically similar to one of the stored user typing signatures, and updating the stored user typing signature for the user whenever the typing signature is statistically similar to the stored user typing signature of the user.

\* \* \* \* \*